(12) United States Patent
Joze (10) Patent No.: US 11,261,597 B2
(45) Date of Patent: Mar. 1, 2022

(54) HEAD FOR A 3D PRINTER AND A METHOD OF USING THE SAME

(71) Applicant: Abram Joze, Senovo (SI)

(72) Inventor: Abram Joze, Senovo (SI)

( * ) Notice: Subject to any disclaimer, the term of this patent is extended or adjusted under 35 U.S.C. 154(b) by 474 days.

(21) Appl. No.: 16/038,189

(22) Filed: Jul. 18, 2018

(65) Prior Publication Data

US 2019/0368189 A1 Dec. 5, 2019

(30) Foreign Application Priority Data

Jun. 1, 2018 (SI) .................. P-201800134

(51) Int. Cl.
| | |
|---|---|
| *E04B 1/35* | (2006.01) |
| *B28B 1/00* | (2006.01) |
| *B33Y 10/00* | (2015.01) |
| *B33Y 80/00* | (2015.01) |
| *B33Y 50/02* | (2015.01) |
| *B33Y 70/00* | (2020.01) |
| *B33Y 30/00* | (2015.01) |

(52) U.S. Cl.
CPC ............ *E04B 1/3505* (2013.01); *B28B 1/001* (2013.01); *B33Y 10/00* (2014.12); *B33Y 30/00* (2014.12); *B33Y 50/02* (2014.12); *B33Y 70/00* (2014.12); *B33Y 80/00* (2014.12)

(58) Field of Classification Search
CPC ....... E04B 1/3505; B28B 1/001; B33Y 10/00; B33Y 30/00; B33Y 50/02; B33Y 70/00; B33Y 80/00
See application file for complete search history.

(56) References Cited

U.S. PATENT DOCUMENTS

| | | | |
|---|---|---|---|
| 5,529,471 | A | 6/1996 | Khoshevis |
| 5,656,230 | A | 8/1997 | Khoshevis |
| 6,589,471 | B1 | 7/2003 | Khoshnevis |
| 7,153,454 | B2 | 12/2006 | Khoshnevis |

(Continued)

FOREIGN PATENT DOCUMENTS

| | | | | |
|---|---|---|---|---|
| CN | 205840350 | | 12/2016 | |
| CN | 107165831 A | * | 9/2017 | ............... F04D 3/02 |

(Continued)

*Primary Examiner* — Matthew J Daniels
*Assistant Examiner* — Shibin Liang
(74) *Attorney, Agent, or Firm* — Voyer Law (57) ABSTRACT

A mixing-extruding head apparatus for a three-dimensional (3D) printer for building residential houses and other objects, which enables printing of right-angled corners, the apparatus comprising a container for mixing mortar, the container comprising a funnel (1), a two-part helix (6) inside the container for mixing the mortar for building said objects, wherein the two-part helix (6) is installed on a main axis (2) inside the funnel (1) and the helix (6) comprises an inner metal part (6a) and an outer rubber part (6b), and wherein the helix (6) has at least one thread (turn), and an exit nozzle (14). The bottom part of the exit nozzle (14) is on each of its sides equipped with one of four blades (17), which are controlled by a servo-pneumatic system with computer-controlled commands for building the objects, wherein each of the blades is connected to a piston moved by a pneumatic cylinder; wherein all four pneumatic cylinders are connected with four electromagnetic valves, which generate pneumatic signals.

11 Claims, 9 Drawing Sheets

(56) References Cited

U.S. PATENT DOCUMENTS

| | | |
|---|---|---|
| 7,241,415 B2 | 7/2007 | Khoshnevis |
| 7,291,242 B2 | 11/2007 | Khoshnevis |
| 7,452,196 B2 | 11/2008 | Khoshnevis |
| 7,574,925 B2 | 8/2009 | Khoshnevis |
| 7,641,461 B2 | 1/2010 | Khoshnevis |
| 7,814,937 B2 | 10/2010 | Khoshnevis |
| 7,837,378 B2 | 11/2010 | Khoshnevis |
| 7,841,849 B2 | 11/2010 | Khoshnevis |
| 7,841,851 B2 | 11/2010 | Khoshnevis |
| 7,850,388 B2 | 12/2010 | Khoshnevis |
| 7,874,825 B2 | 1/2011 | Khoshnevis |
| 7,878,789 B2 | 2/2011 | Khoshnevis |
| 8,002,890 B2 * | 8/2011 | Kamada ............... B01F 7/32 106/737 |
| 8,029,258 B2 | 10/2011 | Khoshnevis |
| 8,029,710 B2 | 10/2011 | Khoshnevis |
| 8,047,251 B2 | 11/2011 | Khoshnevis |
| 8,308,470 B2 | 11/2012 | Khoshnevis |
| 8,403,577 B2 | 3/2013 | Khoshnevis |
| 8,518,308 B2 | 8/2013 | Khoshnevis |
| 8,568,121 B2 | 10/2013 | Khoshnevis |
| 8,801,415 B2 | 8/2014 | Khoshnevis |
| 8,863,773 B2 | 10/2014 | Khoshnevis |
| 8,944,799 B2 | 2/2015 | Khoshnevis |
| 8,992,679 B2 | 3/2015 | Khoshnevis |
| 9,206,601 B2 | 12/2015 | Khoshnevis |
| 9,403,725 B2 | 8/2016 | Khoshnevis |
| 2008/0017663 A1 | 1/2008 | Khoshnevis |
| 2009/0043424 A1 | 2/2009 | Khoshnevis |
| 2009/0154983 A1 | 6/2009 | Khoshnevis |
| 2012/0038074 A1 * | 2/2012 | Khoshnevis ............ B28B 1/001 264/34 |
| 2013/0059025 A1 | 3/2013 | Khoshnevis |
| 2014/0252668 A1 * | 9/2014 | Austin ................... B28B 3/20 264/40.7 |
| 2015/0300036 A1 | 10/2015 | Khoshnevis |
| 2016/0083956 A1 | 3/2016 | Khoshnevis |
| 2017/0151610 A1 | 6/2017 | Khoshnevis |
| 2018/0345533 A1 * | 12/2018 | Hernandez ............ B33Y 30/00 |

FOREIGN PATENT DOCUMENTS

| | | | |
|---|---|---|---|
| CN | 107363997 | 11/2017 | |
| EP | 1945436 B1 | 7/2008 | |
| EP | 1117328 B1 | 9/2008 | |
| EP | 3431172 * | 6/2017 | ............... B01F 5/04 |
| EP | 3131720 A4 | 9/2017 | |

* cited by examiner

HEAD FOR A 3D PRINTER AND A METHOD OF USING THE SAME

FIELD OF THE INVENTION

The present invention belongs to the field of construction and transport, more precisely to the field of devices for three-dimensional printing of buildings and houses.

The Technical Problem

The present invention is based on the following problem: how to three-dimensionally print walls of buildings or houses with right-angled walls and corners. Known printers extrude the mortar so that the corners are rounded. The right-angled corners then have to be manually formed, which represents additional building/printing time and cost. The problem is thus to construct a system that enables printing of straight walls and right-angled corners of an object, such as a mixing-extruding head for a 3D printer for printing building walls and a method of printing a building.

Additionally, 3D printing of walls and right-angled corners the mortar has to have such quality that when mixed into a building mass it can be continuously extruded through a funnel and supply pipe of a container into a unit for extruding layers for printing and/or building. Thus, the building mass for printing walls has to be uniformly mixed and continuously fed to an exit hole of the printing head. A very common problem is that due to different granulations in the mortar, the mass gets stuck in the funnel and cannot continuously proceed towards the exit hole. In order to print fine layers the mortar has to be finer as for printing larger (thicker) layers. This is not enabled by known devices. Hence, a further constructional task of the invention is to design the system so that it prevents jamming of the mortar in the funnel due to its density or granulations. The mixing head for the 3D printer has to enable adaptation to any mortar composition, particularly to different granulations.

STATE OF THE ART 3D printers for making buildings and houses are becoming increasingly popular. There are several companies on the market, which have the necessary knowledge and equipment for printing/building houses. The basis for such printing is a computer program, which is based on a building plan. The equipment and mechanical carrier of the 3D printer with pipes for providing the mortar are computer controlled and enable controlled construction of the building or house with individual layers of mortar.

DETAILED DESCRIPTION

A mixing-extruding head for a 3D printer for building objects or houses according to an embodiment of the invention has four blades surrounding an exit nozzle, the blades being controlled by a servo-pneumatic system with computer-controlled commands (instructions) for printing right-angled corners and required wall forms. Further, the essence of the invention is also an embodiment with a two-part helix inside a container for mixing the suitable mortar for printing the corners and walls. The two-part helix is mounted on a main axis; its inner part is made of metal and is welded onto the circumference of the bottom part of the main axis, while the outer part of the helix is made of rubber. The rubber outer part prevents the larger particles from becoming stuck in the funnel, which enables uniform layering of the mortar, which is essential for making walls and corners, especially right-angled corners. The helix has from one to six threads (turns), preferably three threads. The outer part of the helix is glued to the outer rim of the inner metal part and additionally fastened with rivets. The two-part helix is installed in the head so that it is welded onto the circumference of the main axis, which is partly located in the wider part of the funnel and partly in the narrower cylindrical part. The mixing-extruding head has two embodiments, rotational and orthogonal.

The mixing extruding head for a 3D printer according to an embodiment of the invention will be described in further detail based on an example embodiment and figures, which show.

The mixing-extruding head for a 3D printer is designed for building residential houses and other constructional objects and can be mounted into any mobile system for 3D building printer. Preferably, the mixing-extruding head is installed in a crane equipped with all necessary delivery and dosing conduits for supplying and mixing the constructional mass, which is to be extruded to the prepared surface based on the building plan and on the pre-programmed procedure for making the walls and openings of a building. A feature of the present invention is that the crane for printing has four carrier walls with their upper sides provided with rails that enable movement of the mixing-extruding head in the x and/or y axis. This enables the whole system to be mounted on the rails and only the mixing-extruding head to be at the site of printing. The position of the exit nozzle is adapted to the height of printing, which allows the head to be moved also in the z axis. The current position of the head depends on the current place of printing, thus on the position of the whole system on the rails in x and y-axis.

In an embodiment, the mixing-extruding head for a 3D printer for building residential houses and other objects is installed on the crane equipped with delivery and dosing conduits for supplying and mixing the constructional mass, which is to be extruded to the prepared surface based on the building plan, wherein the head comprises:
  four blades provided around a non-rotatable exit nozzle, the blades being controlled by a servo-pneumatic system with computer-controlled orders, for printing right-angled corners and various shapes of walls, and
  the two-part helix inside a container for mixing the suitable mortar for printing the above-mentioned walls and corners, wherein the two-part helix is mounted on the main axis inside the funnel and comprises the inner metal part and the outer rubber part.

In a "rotational mixing-extruding head" style embodiment of the bottom part of the mixing-extruding head, the exit nozzle is rotatable for 360 degrees around its vertical axis and enables manufacturing of straight and rounded walls with 90-degree (right-angled) corners.

Figure 1:
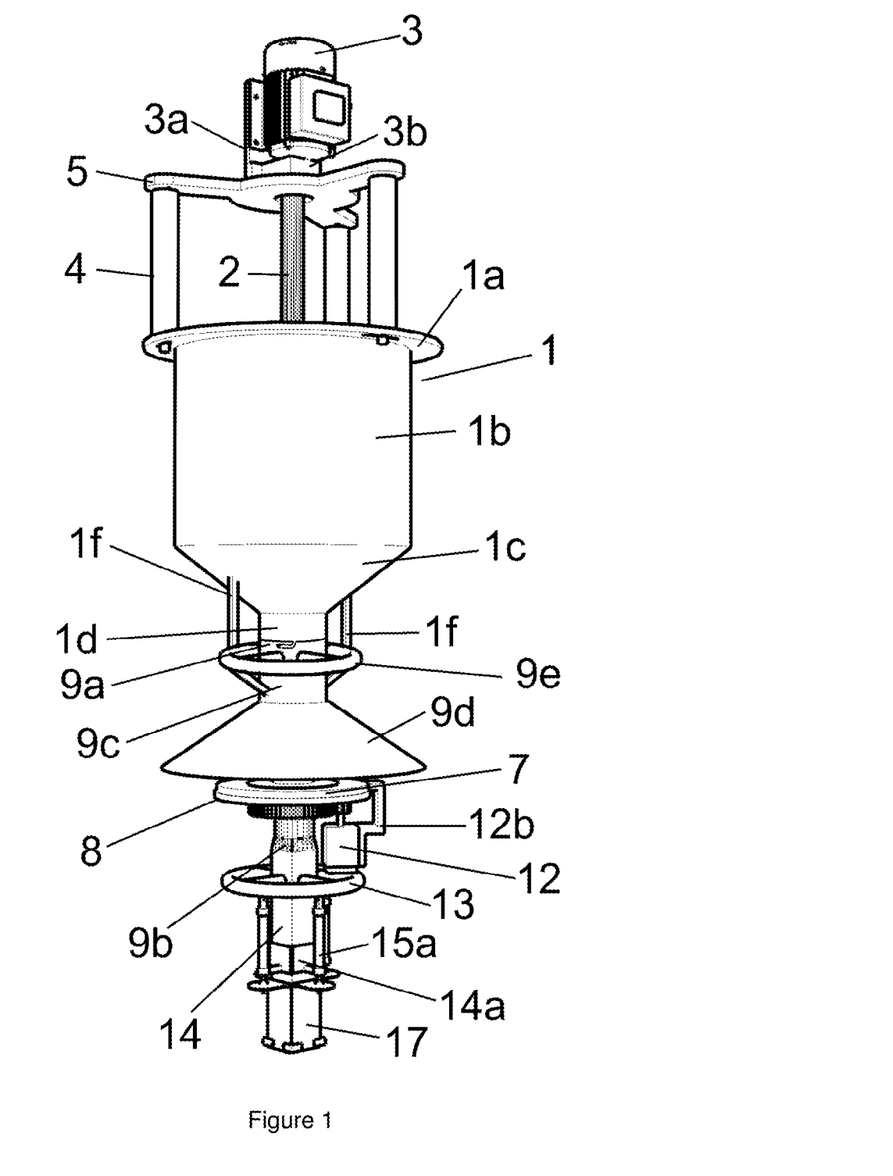
FIG. 1 shows a mixing-extruding head according to an embodiment of the invention.

In an embodiment, the mixing-extruding head for a 3D printer comprises a funnel 1 with a main axis 2, which is through a coupling 3a and a reducer 3b connected with the axis of an electric motor 3. An upper rim 1a of the funnel 1 is through slots provided with three distancing elements 4, which are attached to the rim 1a of the funnel 1 through the slots with attachments 4a. The coupling 3a and the reducer 3b of the motor 3 are mounted onto a holder 5. The holder 5 has in its middle a circularly shaped center part with a circular opening and three branches for installing the distancing elements 4. The carrier 5 is mounted onto the main axis 2 with one screw.

Figure 2:
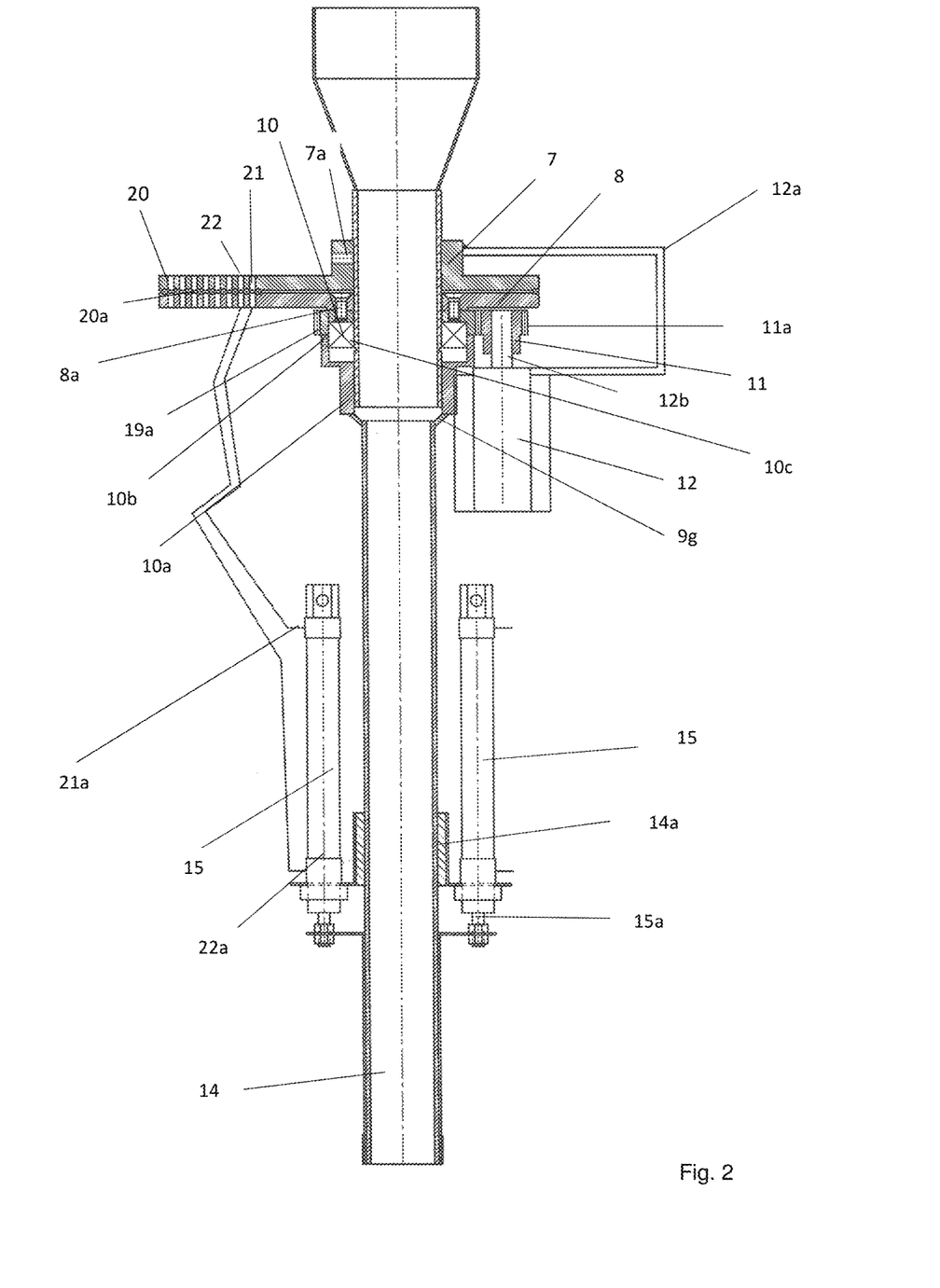
FIG. 2 shows a partial section of the rotational mechanism according to an embodiment of the invention.

The diameter of the funnel 1 is smaller than the diameter of the rim 1a, which continues into a first cylindrical part 1b of the funnel 1, which then continues into a first conus part 1c and a narrower cylindrical part 1d. Between the first conus part 1c and the narrower cylindrical part 1d two handles 1f are welded in order to enable easier manipulation of the funnel 1. A cylindrical part 9a is attached to the narrow cylindrical part 1d with grooves on part 9a and three screws 9b. The cylindrical part 9a continues into a second cylindrical part 9c, onto which a ring 9e is welded with four attachments. The ring 9e enables manual rotation of the whole head. According to one of the possible embodiments the head can also be without the ring 9e. The second cylindrical part 9c is shaped into a conus part 9d, which has in its middle a third cylindrical part 9f, to which a mechanism for rotational drive and eight pneumatic tubular installations 20 are mounted in order to allow connection to four two-way pneumatic cylinders 15, wherein four tubes are for connection with the upper parts of the cylinders 15 and four tubes are for connection with the bottom parts of the cylinders 15. Four blades 17 are attached to four pistons 15a, the blades allow shaping of the mortar layer coming from the exit nozzle 14 of the head. The third cylindrical part 9f is via an inclined tube 9g shaped into the exit nozzle 14 with rectangular sides (FIGS. 1 and 2).

To the cylindrical part 9f, which is located between the part 9d and part 9g, an upper disc 7 is attached with a threaded screw 7a in a fixed manner. Below the upper disc 7 is a rotatable bottom disc 8. The bottom disc 8 is with screws 8a attached to a holder 11 of a small sprocket wheel 11a. On the cylindrical part 9d and inside a holder 19 a ball bearing 10 is provided, the bearing 10 being fixed with a clamp 10c (Zeger ring) and closed on the bottom side with a housing 10a. The wall of the bearing 10 is fixed to the holder 19 with a screw located in a threaded hole 10b. The bearing 10 enables rotation of the large sprocket wheel 19a. The large sprocket wheel 19a is driven via the small sprocket wheel 11a, which is turned on and rotated by a servomotor 12 via a shaft 12a. The servomotor 12 is attached with a holder 12b onto the upper disc 7. According to the procedure, which is the basis for the program controlling the printing, operation of the servomotor 12 is controlled, so that the servomotor 12 rotates the large when 19a through the small wheel 11a resulting in rotation of the exit nozzle 14 for a pre-determined angle (FIG. 2).

On the outer part of the upper disc 7 and bottom disc 8 eight pneumatic tubular installations 20, between which rubber sealing strings 20a are provided. In the upper eight connecting sites are pairs of tubes 21, 22, which are connected to the four electromagnetic valves for converging electrical control signals into pneumatic. In the lower eight connecting sites are pairs of tubes 21a, 22a for connection with four pneumatic cylinders 15 that move the pistons 15a for each of the four blades 17. One pair of tubes 21a, 22a are connected to each cylinder 15, wherein the tube 21a is connected to the upper part of the cylinder 15, while the tube 22a is connected to the lower part of the cylinder 15. The upper disc 7 is rigidly connected with the holder 12b of the servomotor 12, which with the axis 12b rotates the holder 11 of the small sprocket wheel 11a. Under the servomotor 12 a ring 13 is provided, the ring 13 being equipped with accessories that are welded onto the four-angled exit nozzle 14, to which also four carriers 14a of pneumatic cylinders 15 are attached, wherein the pistons of the cylinders lift and lower the blades 17. All four cylinders 15 are connected with the tubes 21a, while tubes 22a are connected with the pistons 15a. Based on the object or house plan and the program connected with this printing project the blades 17 will be activated or deactivated, for example in printing a straight wall two parallel blades will be activated.

The mixing-extruding head according to an embodiment of the invention has in addition to control of the four blades from active into inactive position also a possibility to turn the four-cornered nozzle for any angle. This turn is enabled with the servomotor 12, which can rotate the extruding head for 360 degrees according to the program. The bottom part of the four-cornered exit nozzles 14 is equipped with four blades 17, each on one side of the nozzle. The blades are lowered and lifted by the pistons of pneumatic cylinders based on eight pneumatic signals, which are generated by valves, such as electromagnetic valves.

Figure 1A:
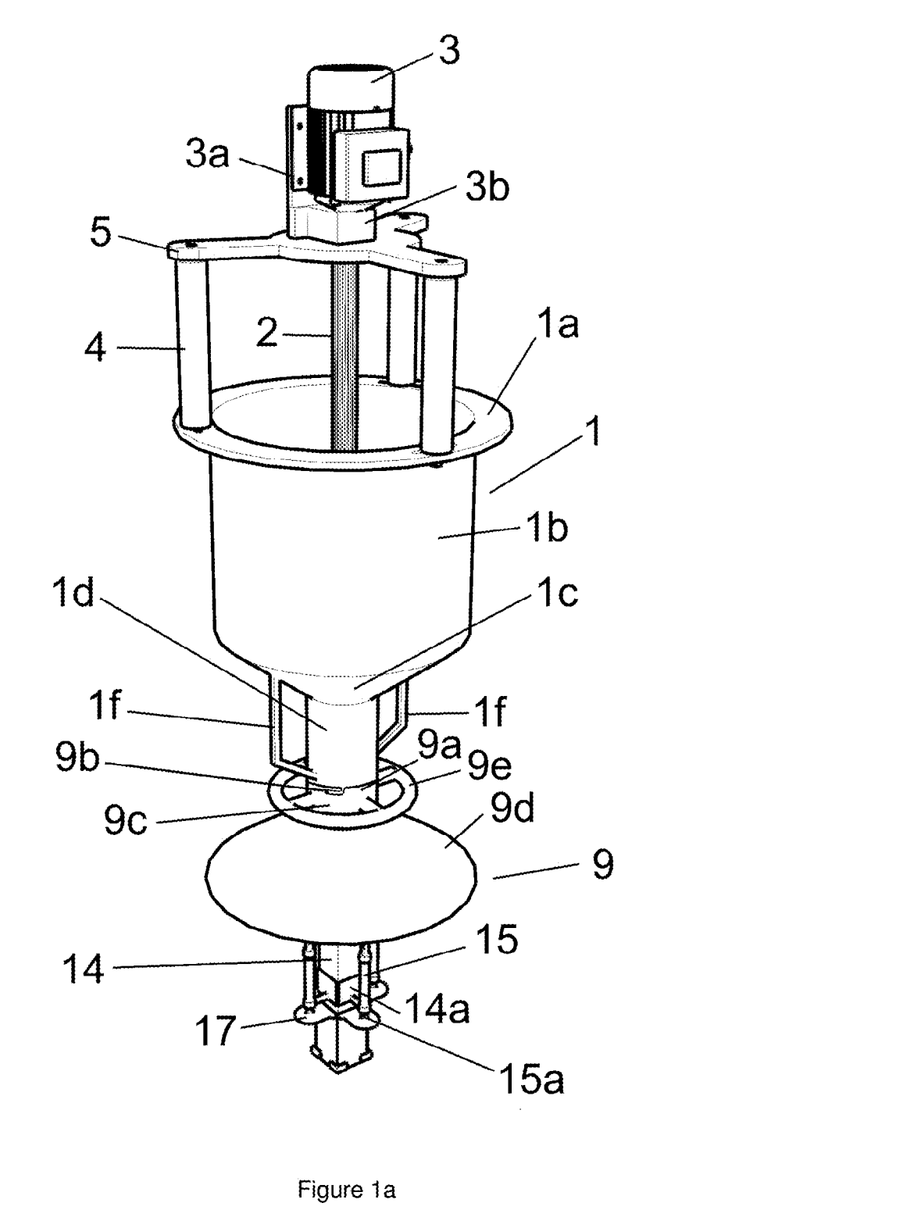
FIG. 1a shows an orthogonal mixing-extruding head according to an embodiment of the invention.

The mixing-extruding head according to an embodiment does not have the mechanism for rotation of the exit nozzle 14 and operates only in the orthogonal manner, thus in x and y axis and allows building walls with 90-degree angles between them. This embodiment differs from the embodiment described above in that it does not have the system for rotation of the exit nozzle and has only four pairs of tubes, which come from the four electromagnetic valves for conversion of electric control signals into pneumatic signals connected to four pneumatic cylinders and their pistons, to which the blades 17 are attached.

Figure 3:
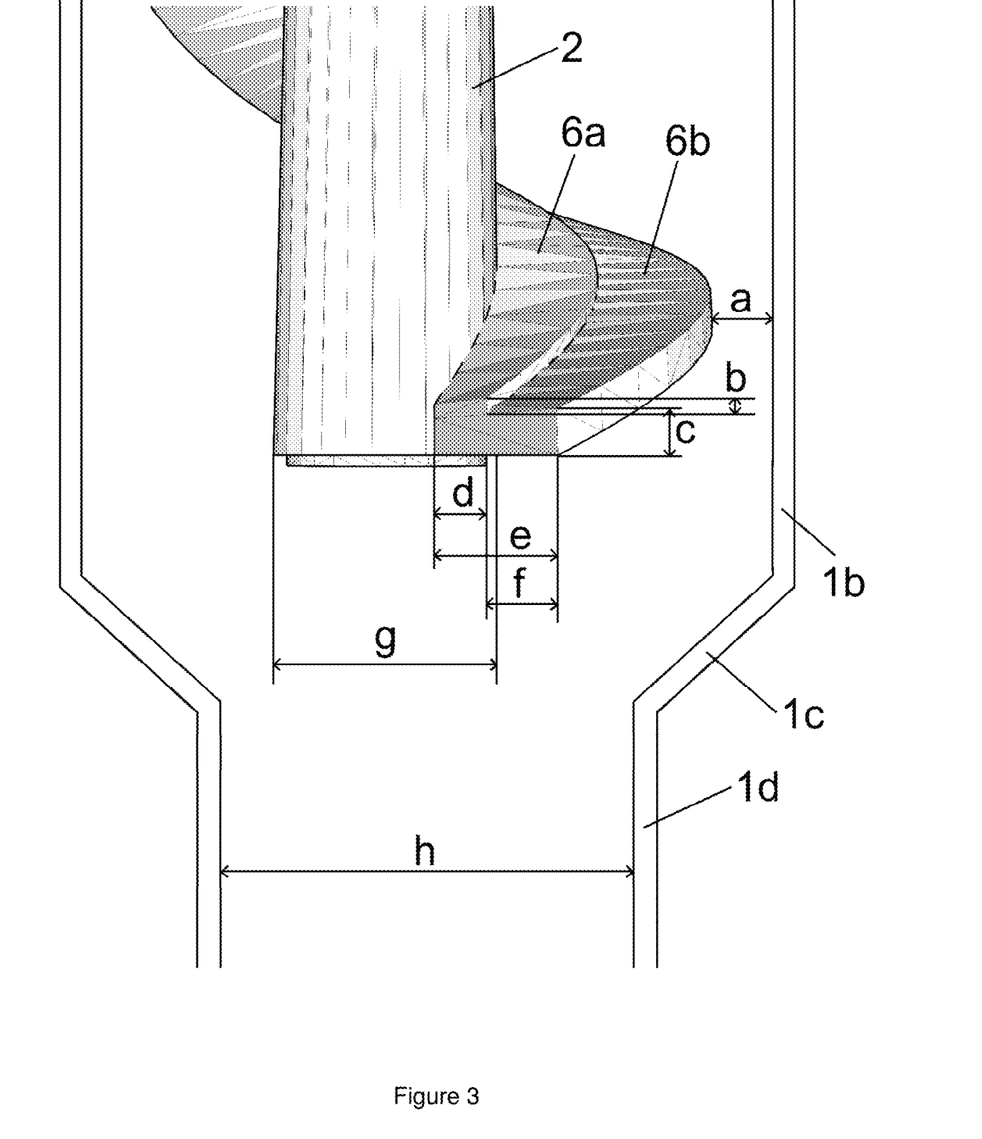
FIG. 3 shows the helix according to an embodiment of the invention.

As shown in FIG. 3, the two-part helix 6 is installed on the bottom part of the main axis 2 inside the funnel 1. Dimensional relationships between individual parts of the funnel 1, axis 2 and helix 6 depend on the mortar granulation, which will be used for printing the object or house. The distance from the rim of the helix 6 from part 1b of the funnel is marked with letter a, the width of the helix 6 is marked with letter e. The diameter of the main axis 2 is marked with letter g, while the diameter of the narrow part 1f is marked with letter h. The width of the inner part of the helix 6 is marked with letter d, the width of the outer part 6b of the helix 6 is marked with letter f. The height of the outer part 6b of the helix 6 is marked with letter c, the inner part 6a of the helix is higher than the outer part 6b of the helix for a height that is marked with letter b. The dependency of dimension of individual elements of the funnel 1 is shown in the table 1 below, in connection with the GAM aggregate granulation in the mortar (see also FIG. 3).

TABLE 1

Dependency of dimensions of individual elements of the funnel on the aggregate granulation in the mortar

| Aggregate granulation in the mortar (mm) | a (mm) | b (mm) | c (mm) | d (mm) | e (mm) | f (mm) | g (mm) | h (mm) |
|---|---|---|---|---|---|---|---|---|
| 1 | 1 | 3 | 5 | 30 | 31 | 1 | 32 | 11-200 |
| 2 | 1 | 3 | 5 | 30 | 32 | 2 | 32 | 12-200 |
| 3 | 1 | 3 | 5 | 30 | 33 | 3 | 32 | 13-200 |
| 4 | 1 | 3 | 5 | 30 | 34 | 4 | 32 | 14-200 |
| 5 | 1 | 3 | 5 | 30 | 35 | 5 | 32 | 15-200 |
| 6 | 1 | 3 | 5 | 30 | 36 | 6 | 32 | 16-200 |
| 7 | 1 | 3 | 5 | 30 | 37 | 7 | 32 | 17-200 |
| 8 | 1 | 3 | 5 | 30 | 38 | 8 | 32 | 18-200 |
| 9 | 1 | 3 | 5 | 30 | 39 | 9 | 32 | 19-200 |
| 10 | 1 | 4 | 5 | 30 | 40 | 10 | 32 | 20-200 |
| 11 | 1 | 4 | 10 | 30 | 41 | 11 | 32 | 21-200 |
| 12 | 1 | 4 | 10 | 30 | 42 | 12 | 32 | 22-200 |
| 13 | 1 | 4 | 10 | 30 | 43 | 13 | 32 | 23-200 |
| 14 | 1 | 4 | 10 | 30 | 44 | 14 | 32 | 24-200 |
| 15 | 1 | 4 | 10 | 30 | 45 | 15 | 32 | 25-200 |
| 16 | 1 | 4 | 10 | 30 | 46 | 16 | 32 | 26-200 |
| 17 | 1 | 4 | 10 | 30 | 47 | 17 | 32 | 27-200 |
| 18 | 1 | 4 | 10 | 30 | 48 | 18 | 32 | 28-200 |
| 19 | 1 | 4 | 10 | 30 | 49 | 19 | 32 | 29-200 |
| 20 | 1 | 5 | 10 | 30 | 50 | 20 | 50 | 30-200 |
| 21 | 1 | 7 | 10 | 30 | 51 | 21 | 50 | 31-200 |
| 22 | 1 | 7 | 10 | 30 | 52 | 22 | 50 | 32-200 |
| 23 | 1 | 7 | 10 | 30 | 53 | 23 | 50 | 33-200 |
| 24 | 1 | 7 | 10 | 30 | 54 | 24 | 50 | 34-200 |
| 25 | 1 | 7 | 10 | 30 | 55 | 25 | 50 | 35-200 |
| 26 | 1 | 7 | 10 | 30 | 56 | 26 | 50 | 36-200 |
| 27 | 1 | 7 | 10 | 30 | 57 | 27 | 50 | 37-200 |
| 28 | 1 | 7 | 10 | 30 | 58 | 28 | 50 | 38-200 |
| 29 | 1 | 7 | 10 | 30 | 59 | 29 | 50 | 39-200 |
| 30 | 1 | 7 | 10 | 30 | 60 | 30 | 70 | 40-200 |
| 31 | 1 | 10 | 10 | 30 | 61 | 31 | 70 | 41-200 |
| 32 | 1 | 10 | 10 | 30 | 62 | 32 | 70 | 42-250 |
| 33 | 1 | 10 | 10 | 30 | 63 | 33 | 70 | 43-250 |
| 34 | 1 | 10 | 10 | 30 | 64 | 34 | 70 | 44-250 |
| 35 | 1 | 10 | 10 | 30 | 65 | 35 | 70 | 45-250 |
| 36 | 1 | 10 | 10 | 30 | 66 | 36 | 70 | 46-250 |
| 37 | 1 | 10 | 10 | 30 | 67 | 37 | 70 | 47-250 |
| 38 | 1 | 10 | 10 | 30 | 68 | 38 | 70 | 48-250 |
| 39 | 1 | 10 | 10 | 30 | 69 | 39 | 70 | 49-250 |
| 40 | 1 | 15 | 15 | 40 | 70 | 40 | 70 | 50-250 |
| 41 | 1 | 15 | 15 | 40 | 71 | 41 | 100 | 51-250 |
| 42 | 1 | 15 | 15 | 40 | 72 | 42 | 100 | 52-250 |
| 43 | 1 | 15 | 15 | 40 | 73 | 43 | 100 | 53-250 |
| 44 | 1 | 15 | 15 | 40 | 74 | 44 | 100 | 54-250 |
| 45 | 1 | 15 | 15 | 40 | 75 | 45 | 100 | 55-250 |
| 46 | 1 | 15 | 15 | 40 | 76 | 46 | 100 | 56-250 |
| 47 | 1 | 15 | 15 | 40 | 77 | 47 | 100 | 57-250 |
| 48 | 1 | 15 | 15 | 40 | 78 | 48 | 100 | 58-250 |
| 49 | 1 | 15 | 15 | 40 | 79 | 49 | 100 | 59-250 |
| 50 | 1 | 15 | 15 | 40 | 80 | 50 | 100 | 60-250 |

Inside the first cylindrical part 1*b*, the conus part 1*c* and the second cylindrical part 1*d* of the funnel 1 the bottom part of the main axis 2 is located, this bottom part being provided with the helix 6. The two-part helix 6 has the inner part 6*a* made of metal and welded to the circumference of the main axis 2, while the outer part 6*b* of the helix 6 is made of rubber. The helix 6 has one to six threads (turns), preferably three. On the circumference of the outer rim of the part 6*a* of the helix 6 the outer rim of the part 6*b* of the helix 6 is glued and fixed with rivets. The helix 6 is installed so that the inner circumference of the part 6*a* is welded on the circumference of the main axis 2.

With regards to the size of aggregates or stones in the mortar, the axis and the two-part helix 6 will be dimensionally adjusted, according to table 1. Usually some variants of the axis 2 with the helix 6 for most common mortar aggregates are made, so that the axis with the helix can be easily changed inside the printer head.

The preparation for 3d printing of an object or a house begins with a plan, which is made with a 3D program and is transformed into an .stl file. STL (stereolitography) is a file format, which is characteristic for software CAD created by the American company 3D Systems STL files describe only the surface geometry of the 3D object. The STL file is then processed with for example a program Skeinforge, which is a tool for transforming the 3D model into a basis.gco file. This code defines the height of the layers and what will be printed. The .gco file is the basis for the codes of the printing procedure according to an embodiment of the invention. The steps of this method said are: recognizing the direction of movement, defining eight functions for perpendicular movement of the mixing-extruding head for the orthogonal system. The eight directions of the head movement are four movements to the left in corners L1, L2, L3 and L4 and four movements to the right in corners D1, D2, D3 and D4. Next steps of the procedure are defining the movements of the rotational mechanism, that is rotations for pre-determined angles, as well as defining the height (z) of vertical layers, defining start and stop functions for mortar supply, lifting levels on z axis, defining double x and double y movements, defining the stop area in the program, making a file in format printable.gco, or file in any other suitable format.

Figure 7:
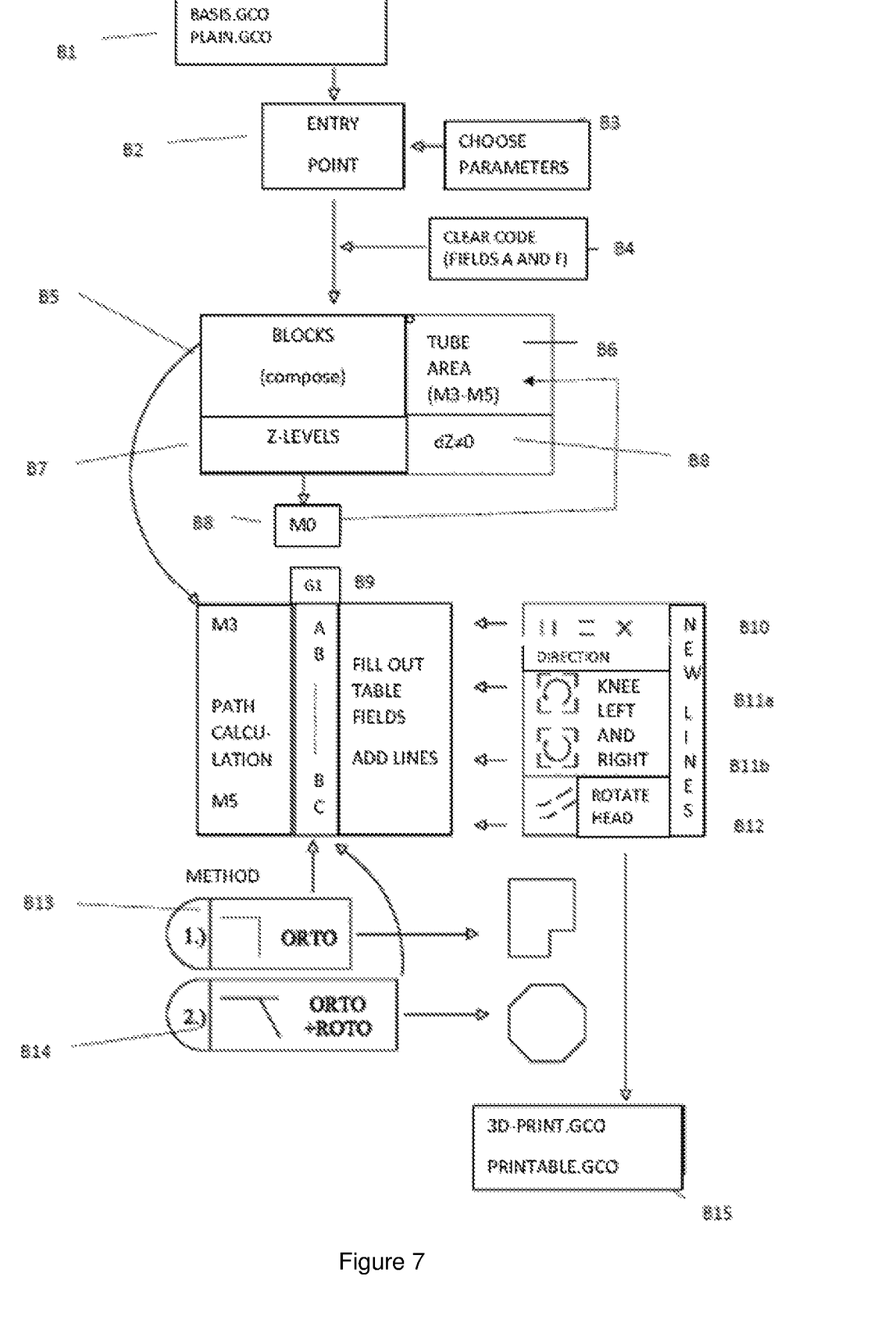
FIG. 7 shows a schematic of the procedure for controlling the three-dimensional printer according to an embodiment of the invention.

FIG. 7 is a scheme of the preparation and printing procedure of a constructional object, preferably a house, which begins with reading the basis.gco file B1. In an entry point B2 a selection of pre-prepared parameters B3 is made, which are needed for printing preparation. Pre-prepared parameters, which can be selected, are starting position of printing, left or right orientation for making corners, data about curves in the walls and similar.

A field in base B4 for variables is cleared and all functions are set to value zero. From the entry point B2 information about selection of initial parameters for the shape of building is carried into a block B5, which is connected with a block B6. The second block B6 has a field for turning on the mortar pump and is marked with a code M3 as well as a field for turning off the mortar pump, which is marked with a code M5.

After each finished layer the mortar pump is turned off with the code M5, which is written in the second block B6. A third block B7 is intended for the program to figure out the height of parameter Z and initiates lifting of the head for the height, which has been entered in the block B3 in the beginning. The height of the layer depends on its thickness. In the third block B7 also the time for lifting the head with the motor is defined, which is for example 1 second=9 mm upwards. From the third block B7 information is proceeded into a fourth block B8, which includes a code MO. When this code occurs, the block B7 sends a code M5 for turning off the motor of the mixer. From the fourth block B8 the code MO stops the motor of the mixer for each layer of building.

From the first block B5 information is sent to a fifth block B9, which includes the codes M3 for turning on and M5 for turning off the mortar pump. Information from a sixth block B10 about orientation of the blades, information from a seventh block B11a about left orientation of the head movement and information from an eight block B11b about right orientation of the head movement for a particular angle are gathered (collected) in the fifth block B9. This block also receives information from a tenth block B13 about operation of orthogonal head and information from an eleventh block B14 about operation of rotational head. An eleventh block B15 includes the final file for printing.

A program for turning on the guide or two pairs of blades, which are positioned opposite each other is written in the sixth block B10. From the sixth block B10 information is forwarded to the fifth block B9. The block B11a includes codes for operation of blades for the orthogonal head, while the block B11b includes codes for operation of blades at all angles for the rotational head. A ninth block B12 is activated when the program recognizes slanted movement and triggers the mechanism for lifting the blades into a passive position. All codes from the blocks B11a, B11b and B12 are forwarded to the fifth block B9, to which also codes from blocks B13 and B14 are sent, wherein these to block define the use of orthogonal or rotational head. From the group of blocks B10, B11a, B11b and B12, the twelfth block B15 comprises files 3D-TISK.GCO and PRINTABLE.GCO, which controls the whole printing procedure.

In an embodiment, the procedure may control the mixing-extruding head for a 3D printer for an orthogonal and rotational head. The basis for this procedure is shown in FIG. 7.

The printing procedure with the four blades 17 and building of 90-degree angles with the orthogonal head follows the program, which recognizes movements for 90-degree angles, which can be left- or right-handed. The computer program for controlling the mixing-extruding head for a 3D printer has to include the eight positions of the four blades 17 and their movement synchronized with opening and closing the mortar supply from the exit nozzle 14 (FIGS. 5 and 6).

Figure 5:
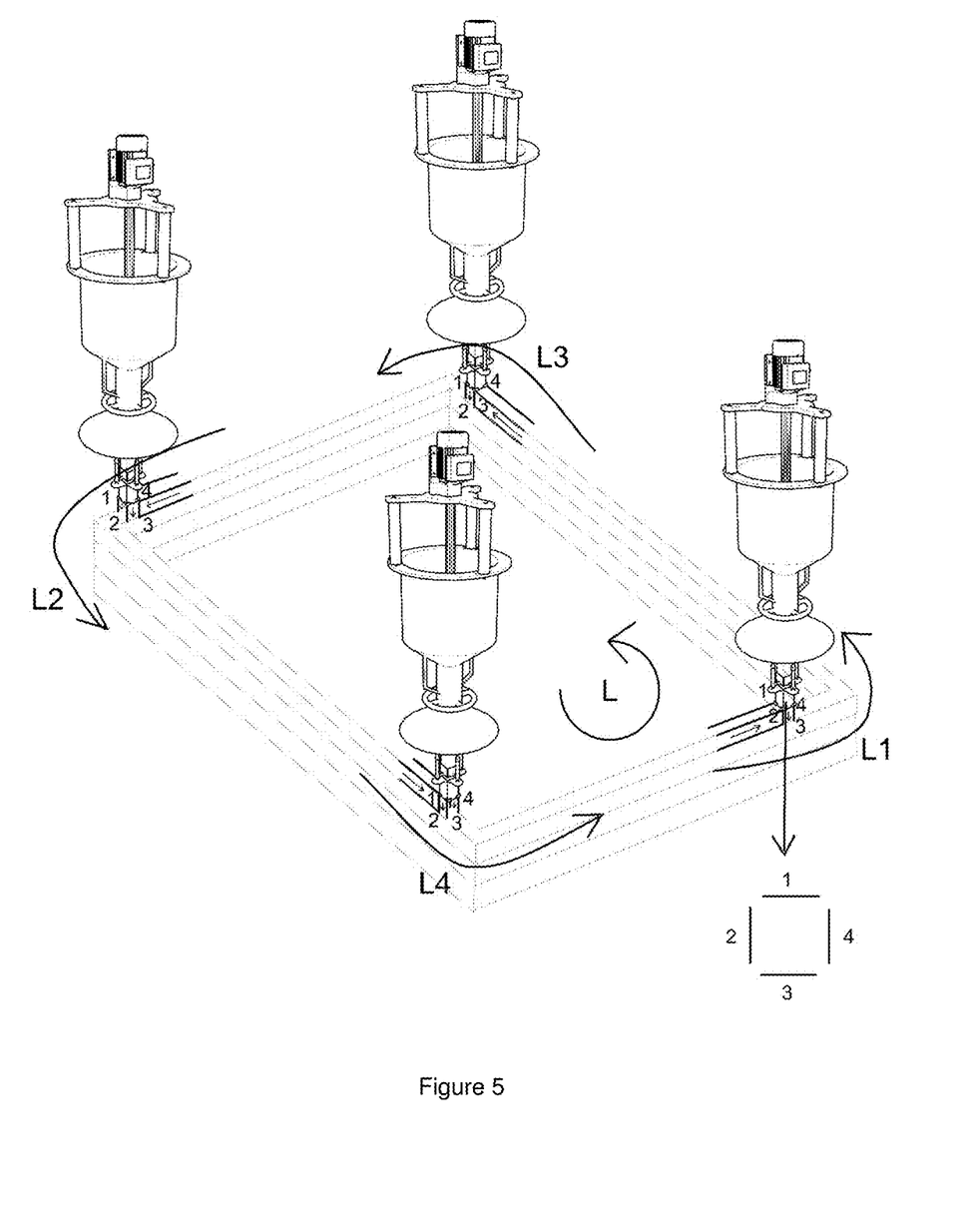
FIG. 5 shows a method of using the head according to an embodiment of the invention.
Figure 6:
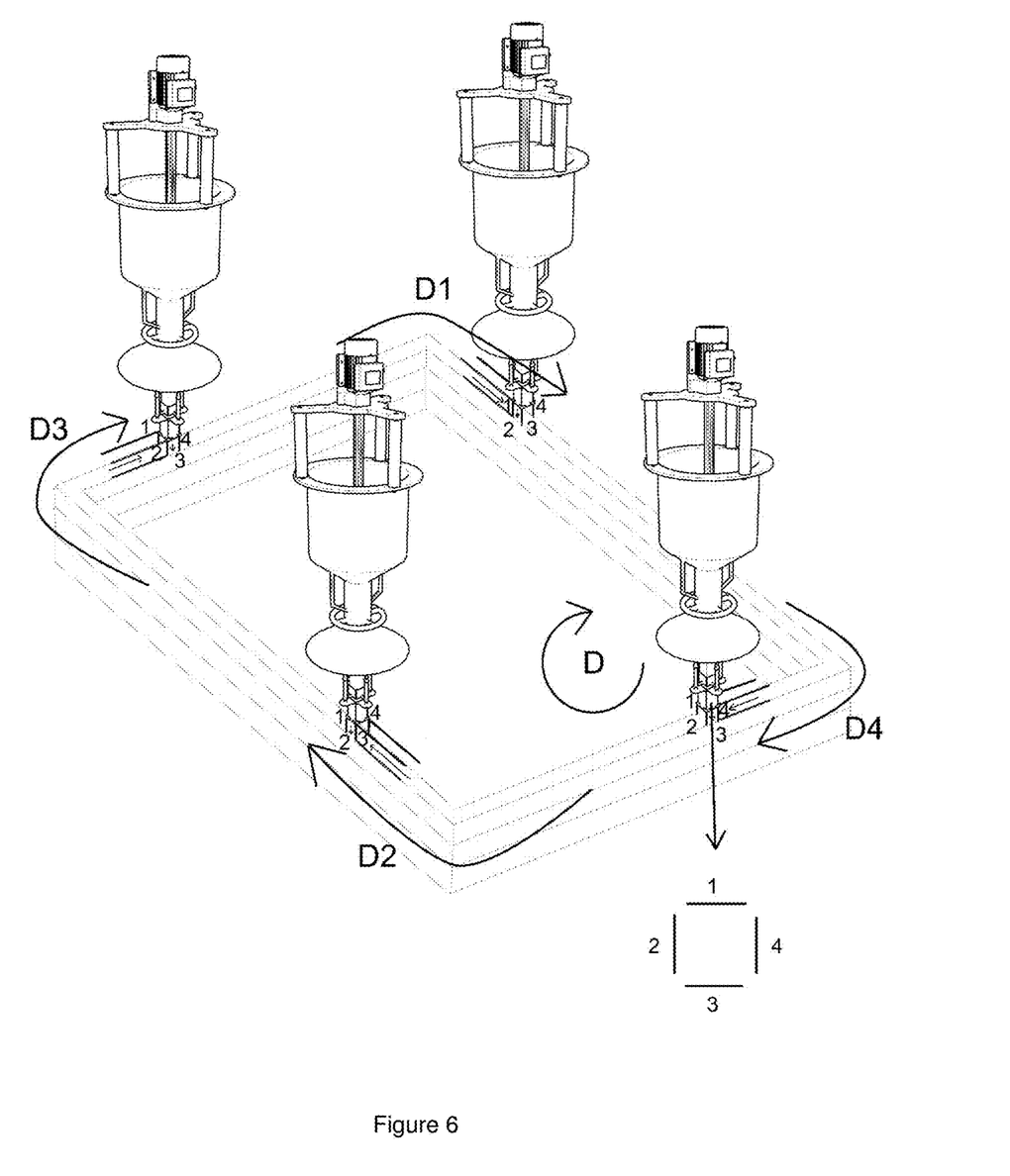
FIG. 6 shows a method of using the head according to an embodiment of the invention.

FIG. 5 shows an embodiment printing four corners, wherein the printing or building, respectively, is carried out in the counter clock-wise direction (left). In the starting corner L1 the wall is printed so that the blade 17 at position 1 and the blade 17 at position 3 are active (pushed down), while the blades 17 at positions 2 and 4 are inactive (lifted). When the printed layer reaches a 90-degree angle, the blade 17 at position 4 is activated (pushed down), while blades 17 at positions 1 and 3 are lifted. After a certain time the blade 17 at position 2 is activated and is pushed 1. This time is typically between 0.5 in 1 second and is also relevant for all activations of blades, where the blades are activated in a certain time. This ensures a smooth layer. The blades 17 at positions 2 and 4 remain active until the next corner L2, which is recognized by the computer program.

Printing or building, respectively, proceeds in the direction of the corner L2, where in the beginning the blades 17 at positions 1 and 3 are active (position down), until the 90-degree angle is reached. Then the blade at the position 2 is activated and pushed down. After that the blades at positions 1 and 3 are lifted, which is followed after a certain time by activation of the blade 17 at the position 4, which is pushed down. The blades at positions 2 and 4 remain active until the next corner, which is recognized by the computer program.

Printing or building, respectively, proceeds in the direction of the corner L3, where in the beginning the blades 17 at positions 2 and 4 are active (position down), until the 90-degree angle is reached. Then the blade at the position 1 is activated and pushed down. After that the blades at positions 2 and 4 are lifted, which is followed after a certain time by activation of the blade 17 at the position 3, which is pushed down. The blades at positions 1 and 3 remain active until the next corner, which is recognized by the computer program.

Printing or building, respectively, proceeds in the direction of the corner L4, where in the beginning blades 17 at positions 2 and 4 are active, until the four-angled exit nozzle 14 reaches a 90-degree corner. Then the blade 17 at the position 3 is activated and pushed down. After that the blades 17 at the positions 2 and 4 are lifted, followed after a certain time by activation of the blade in position 1 by pushing it down. The blades at positions 1 and 3 remain active until the next corner, which is recognized by the computer program.

FIG. 6 shows an embodiment printing four corners, wherein the printing or building, respectively, is carried out in the clock-wise direction (right). Printing or building, respectively, is performed in the direction of the corner D1, wherein the blades 17 at position 1 and 3 are active, until the 90-degree angle is reached. Then the blade 17 at position 4 is activated and pushed down, while the blades at positions 1 and 3 move up. After a certain time, the blade 17 at the position 2 is activated. The blades remain in this pattern of activation until the computer program recognizes the next corner.

Printing or building, respectively, proceeds in the direction of the corner D2, where in the beginning the blades 17 at positions 1 and 3 are active (position down), until the 90-degree angle is reached. Then the blade at the position 2 is activated and pushed down. After that the blades at positions 1 and 3 are lifted, which is followed after a certain time by activation of the blade 17 at the position 4, which is pushed down. The blades at positions 2 and 4 remain active until the next corner, which is recognized by the computer program.

Printing or building, respectively, proceeds in the direction of the corner D3, where in the beginning the blades 17 at positions 2 and 4 are active (position down), until the 90-degree angle is reached. Then the blade at the position 1 is activated and pushed down. After that the blades at positions 2 and 4 are lifted, which is followed after a certain time by activation of the blade 17 at the position 3, which is pushed down. The blades at positions 1 and 3 remain active until the next corner, which is recognized by the computer program.

Printing or building, respectively, proceeds in the direction of the corner D4, where in the beginning blades 17 at positions 2 and 4 are active, until the 90-degree corner is reached. Then the blade 17 at the position 3 is activated and pushed down. After that the blades 17 at the positions 2 and 4 are lifted, followed after a certain time by activation of the blade in position 1 by pushing it down. The blades at positions 1 and 3 remain active until the next corner, which is recognized by the computer program.

Building of the house with right-angled walls is performed so that combination of left turns form corner L1 to corner L4 and right turns from corner D1 to corner D4 are used as described above.

The four blades 17 is positions 1, 2, 3 and 4 for shaping the printed walls are controlled with electropneumatic valves that move the pistons 15a of the pneumatic cylinders 15 up and down. The blades 17 in the lifted (up) position are not active in building, while the blades in lowered (down) position allow shaping of the extruded mortar and build the required shape.

The pneumatic system with computer-controlled commands is responsible for the logic of the operation of the four blades 17 as described below. The computer program is a sequence of program commands, which define the procedure of carrying out operations for printing the building in the plan by the printer. The processing in the program is described with functional, geometric, technological orders, definitions of tools and helping functions. The program comprises individual program sentences, which describe a particular operation or movement of or on the printer.

Figure 4:
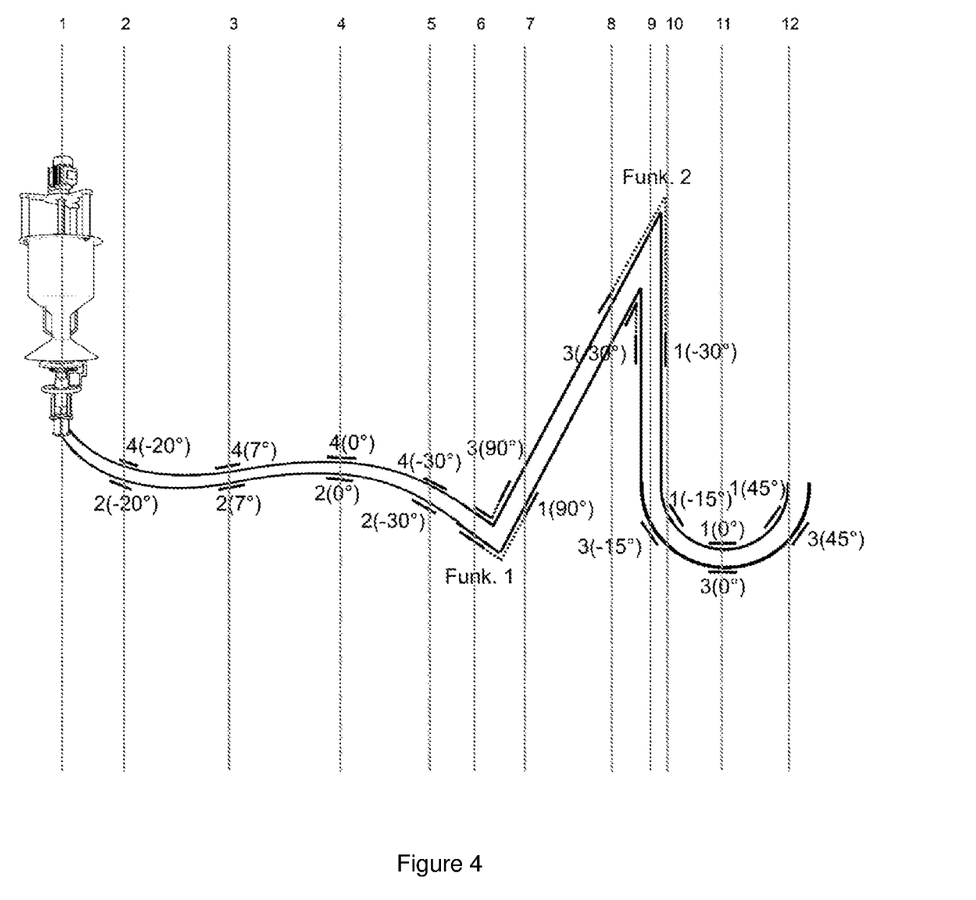
FIG. 4 shows a schematic view of the position of the blades when making different curves and corners of a building according to an embodiment of the invention.

FIG. 4 shows an example of printing with a rotational mixing-extruding head according to an embodiment of the invention, which can rotate and enables building of all kinds of bows, circular elements, curves and all kinds of corners, in particular right-angled corners. FIG. 4 shows an embodiment of 12 points of making a wall as depicted in the lower part of FIG. 4. The positions of the blades 17 are marked with numbers 1, 2, 3 and 4. In step 1 the initial position of the rotating part of the head is set. When the printing begins the sequence of program orders are triggered in accordance with the printer program, the sequence defining the procedure of performing work operations to the printer in order to make the walls according to the current 3D plan. The program triggers movement of the blade 17 at the position 2 and the blade 17 at the position 4. The motor in point 2 receives an order to rotate the head—for example for 20 degrees. Rotation of the head continues to the point 3, where the corner has a value of 7 degrees and blades 17 at positions 2 and 4 are still active. In point 4 the rotating head returns into its initial position. In point 5 the rotating head is rotated for −30 degrees, then in point 6 the program recognizes a 90-degree angle and uses the function f1 for the fastest building of this corner. All movements are absolute values. While making the corner, the blades at positions 2 and 4 are returned into the passive position, while the blade at the position 1 and the blade 17 at the position 3 are activated. In point 7 the function f1 ends and continues into point 8. The program recognizes a function f2, which has to enable printing of a sharp negative corner. It calculates the shortest way of building and the printing continues into point 9, where an order is triggered to rotate the head for additional −30 degrees with the same blades. Printing proceeds to point 10, where the motor 12 moves the head for 15 degrees by using the blades at the position 1 and position 3. In point 11 the position of the head has an absolute value 0, but with the blades on positions 1 and 3. Printing proceeds to point 12 where the head is rotated for 45 degrees.

In 3D printing with the orthogonal mixing-extruding head, where the exit nozzle 14 position is fixed, only building of straight walls and right-angled corners is enabled. Such objects, which encompass the rectangular shape, are standard houses. In order to print with this head 4 functions for left turns (FIG. 5) and 4 functions for right turns (FIG. 6) are used. The building procedure is initiated with the program by selecting one of the previously described processes—movement of the orthogonal mixing-extruding head according to embodiment 1 into left or right.

Figure 8:
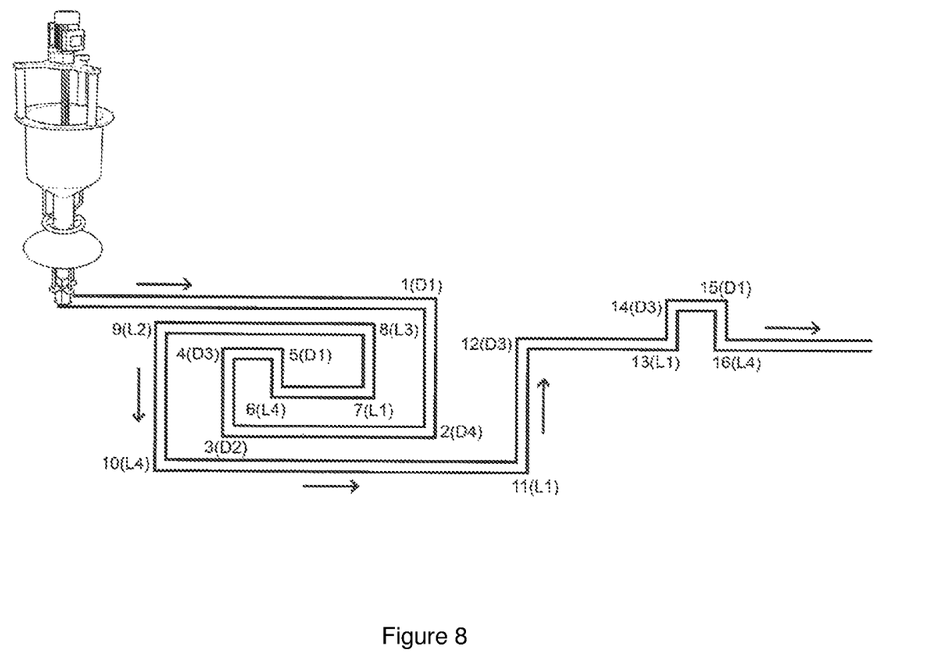
FIG. 8 shows an embodiment of the invention building different right-angled corners.

An example of movement of the mixing-extruding head and recognizing functions for left or right 90-degree angles for corners L1, L2, L3 and L4 and corners D1, D2, D3 and D4, is shown in FIG. 8.

The printing starts and reaches point 1 (D1), in which the function around the corner D1 is need to change the direction. In point 2 (D4) the head is rotated in the clock-wise direction into left, therefore the function of rotation around corner D4 is used. In point 3 (D2) function of rotation around the corner D2 is turned on (see also FIG. 7), because the head travels in the clock-wise direction. In point 4 (D3) is a corner D3, because it is in the clock-wise direction and right. In point 5 (D1) the corner is the same as in point 1 (D1), therefore the function of rotation around the corner D1 is used. In point 6 (L4) (see FIG. 6) the function of rotation around L4 is used. In point 7 (L1) function of rotation around corner L1 is used. In point 8 (L3) function of rotation around corner L3 in FIG. 6 is used. In point 9 (L2) function of rotation around corner L2 is used. In point 10 (L4) function of rotation around corner L4 in FIG. 6 is used. In point 11 function of rotation around corner L1 is used. In point 12 (D3), the corner is D3 from the FIG. 6. In point 13 (L1) function of rotation around corner L1 is used. In point 14 (D3) the turn has the function of rotation as for the corner D3. In point 15 (D1), the function of rotation around corner D1 is as in FIG. 6. In point 16 (L4), the function of rotation is the same as for corner L4 in FIG. 5.

The invention claimed is:

1. A mixing-extruding head apparatus for a three-dimensional (3D) printer for building structures, the apparatus comprising:

a container for mixing mortar, the container comprising a funnel (1), a helix (6) disposed within the container for mixing the mortar, wherein the helix (6) is installed on a main axis (2) within the funnel (1);

an exit nozzle (14) comprising top and bottom parts, the bottom part of the exit nozzle (14) comprising four blades (17) pivotally thereto, for printing right-handed corners using the mortar layer coming from the exit nozzle (14); and a servo-pneumatic system for independently controlling each of the four blades (17), the servo-pneumatic system comprising computer-controlled commands for building the structures, the servo-pneumatic system further comprising:

at least one piston (15a) connected to each of the four blades for independently actuating each of the four blades (17);

at least one cylinder (15) associated with the at least one piston (15a); and at least one electromagnetic valve associated with the at least one cylinder for generating pneumatic signals.

2. The apparatus of claim 1 further comprising an exit nozzle (14) rotatable around a vertical axis; and a servomotor (12) for enabling rotation of the exit nozzle (14) for 360 degrees around the vertical axis.

3. The apparatus of claim 1 further comprising a holder comprising a circularly shaped center part comprising a circular opening and three branches for installing the distancing elements (4);

an electric motor (3) rotatable around an axis, the motor comprising a coupling (3a), and a reducer (3b) connected to the axis of the electric motor (3);

wherein the funnel (1) comprises an upper rim (1a) and three distancing elements (4) comprising accessories (4a) disposed through slots in the rim (1a);

the coupling (3a) and the reducer (3b) of the motor (3) are mounted onto the holder (5); and the carrier (5) is mounted onto the main axis (2) with one screw.

4. The apparatus of claim 3, wherein the diameter of the funnel (1) is smaller than the diameter of the rim (1a), which continues into a first cylindrical part (1b) of the funnel (1), which through a first conus part (1c) continues into a narrow cylindrical part (1d);

between the first conus part (1c) and the narrow cylindrical part (1d) two handles (1f) are welded for easier manipulation with the funnel (1);

to the narrow cylindrical part (1d) a cylindrical part (9a) is attached with adapted grooves on the part (9a) and three screws (9b);

the cylindrical part (9a) continues into a second cylindrical part (9c), which is shaped into a conus part (9d), which has in its middle a third cylindrical part (9f), to which a mechanism for rotational drive and eight pneumatic tubular installations (20) are mounted in order to allow connection to four two-way pneumatic cylinders (15), wherein four tubes are for connection with the upper parts of the cylinders (15) and four tubes are for connection with the bottom parts of the cylinders (15);

the third cylindrical part (9f) is via an inclined tube (9g) shaped into the exit nozzle (14) with rectangular sides.

5. The apparatus of claim 4, further comprising parts (9d, 9g);

a cylindrical part (9f) located between the parts (9d, 9g);

an upper disc (7) fastened to the cylindrical part (9f);

a rotatable bottom disc (8) fastened to a holder (11) of a small sprocket wheel (11a);

a large sprocket wheel (19a);

a small sprocket wheel (11a) for driving the large sprocket wheel (19a);

a ball bearing (10) affixed to the bottom side with a housing (10a), for enabling rotation of the large sprocket wheel (19a);

a wall of the ball bearing (10) affixed to a holder (19);

a shaft (12a);

a servomotor (12) attached with a holder (12b) onto the upper disc (7) for actuating the large sprocket wheel (19a) via the shaft (12a) and the small sprocket wheel (11a) for rotating the exit nozzle (14) for a pre-determined angle.

6. The apparatus of claim 5, wherein on the outer part of the upper disc (7) and bottom disc (8) eight pneumatic tubular installations (20), between which rubber sealing strings (20a) are provided;

in the upper eight connecting sites are pairs of tubes (21, 22), which are connected to the four electromagnetic valves for converging electrical control signals into pneumatic;

in the lower eight connecting sites are pairs of tubes (21a,22a) for connection with four pneumatic cylinders (15) that move the pistons (15a) for each of the four blades (17);

one pair of tubes (21a,22a) are connected to each cylinder (15), wherein the tube (21a) is connected to the upper part of the cylinder (15), while the tube (22a) is connected to the lower part of the cylinder (15);

the upper disc (7) is rigidly connected with the holder (12b) of the servomotor (12), which with the axis (12b) rotates the holder (11) of the small sprocket wheel (11a);

under the servomotor (12) a ring (13) is provided, the ring (13) being equipped with accessories that are welded onto the four-angled exit nozzle (14), to which also four carriers (14a) of pneumatic cylinders (15) are attached, wherein the pistons of the cylinders lift and lower the blades (17); and the ring (13) enables manual setting of the starting position of blades (17).

7. The apparatus of claim 4, further comprising a ring (9e) comprising four accessories welded to the part (9c) for manual rotation of the whole head.

8. The apparatus of claim 1, wherein the dimensions of the funnel (1), axis (2) and helix (6) are based on the granulation of the mortar.

9. The apparatus of claim 1 the helix (6) comprising a two part helix comprising:

an inner metal part (6a)

an outer rubber part (6b), and at least one thread.

10. A three-dimensional printer for building residential houses and other objects, which has the mixing-extruding head according to claim 1.

11. A crane for printing, which has a mixing-extruding head apparatus according to claim 1, wherein the crane is:

equipped with all necessary delivery and dosing supplies of the material of mixing the building compositions, which is to be extruded to the prepared bases in accordance with the plan of the house or object, and has four carrier walls with upper sides provided with rails that enable movement of the mixing-extruding head along x and/or y axis.

* * * * *